United States Patent [19]
Baker

[11] 3,797,693
[45] Mar. 19, 1974

[54] POLYGONAL SHAPED FRY PAN COVER AND METHOD OF MAKING

[75] Inventor: Robert A. Baker, Santa Barbara, Calif.

[73] Assignee: Aluminum Filter Company, Santa Barbara, Calif.

[22] Filed: June 28, 1972

[21] Appl. No.: 266,979

[52] U.S. Cl. .............................. 220/44 A, 55/384
[51] Int. Cl. ............................................ B65d 51/16
[58] Field of Search ...................... 220/44 A; 55/384

[56] References Cited
UNITED STATES PATENTS
3,452,895   7/1969   Kalkowski .......................... 220/44 A
3,343,345   9/1967   Carolan ................................ 55/384

Primary Examiner—George T. Hall
Attorney, Agent, or Firm—Robert E. Geauque

[57] ABSTRACT

The apparatus and method of making a polygonal-shaped fry pan utensil which is to be located over the top of an open heating vessel such as a frying pan to prevent splatter from the heating vessel comprising forming a plurality of corners within a rigid edging material until the edging forms a closed configuration, placing the edge of the material and a screen assembly within a mold, the corner forming portions of the mold being smaller in width than the remaining forming portions of the mold, applying a uniform force to the mold resulting in cold working of the edging material into engagement with the screening assembly to securely bind such in a taut position, the corners of the edging being cold worked to a greater degree than the remaining portion of the edging to insure that the screening assembly will be held taut within the formed edging.

10 Claims, 7 Drawing Figures

PATENTED MAR 19 1974 3,797,693
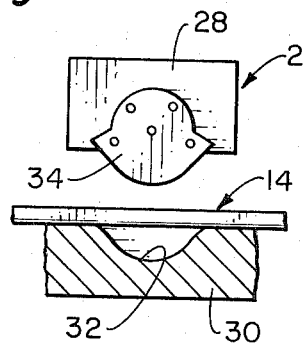
Fig. 1.
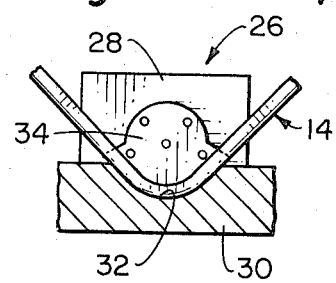
Fig. 2.
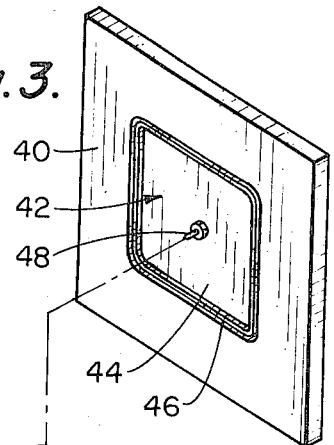
Fig. 3.
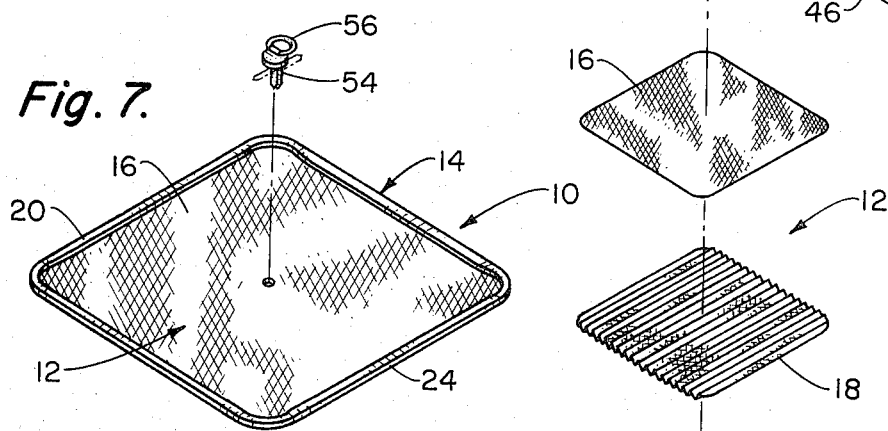
Fig. 7.
Fig. 4.
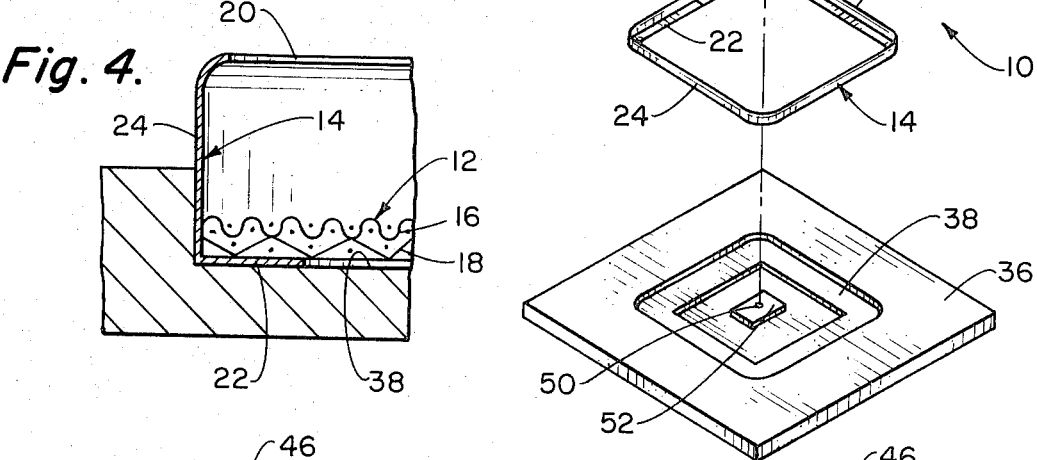
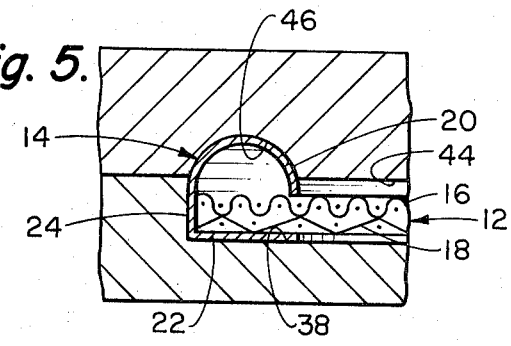
Fig. 5.
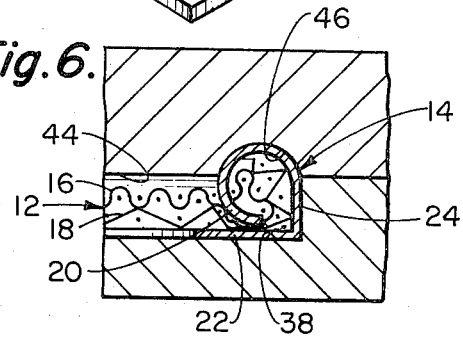
Fig. 6.

POLYGONAL SHAPED FRY PAN COVER AND METHOD OF MAKING

BACKGROUND OF THE INVENTION

The field of this invention relates to a utensil for preventing splatter from cooking vessels such as frying pans, cooking pots, casseroles, or the like, and more particularly to a method of making such a utensil.

During the frying of foodstuffs in a cooking vessel, the water content, which is inherently contained within those foodstuffs, when coming into contact with the frying grease or oil, results in a splattering of the hot grease exteriorly of the cooking vessel in a fine droplet form. This not only causes the surroundings to be soiled, but any person that is standing in the vicinity can suffer quite painful burns. One way in which this can be prevented is by placing a lid on the frying vessel. However, this has the disadvantage that saturated steam is then formed within the frying vessel and therefore the foodstuff in the vessel is steamed rather than fried, and no crust will be formed thereon. Thus, if the foodstuff is to be fried rather than steamed, one cannot counteract the above mentioned splattering of grease by providing the frying vessel with a lid.

Previously, it has been known to employ the use of a splatter screen over a cooking vessel. The splatter screen has an aperture size which is small enough to prevent the grease droplets from escaping through the screen but the apertures are large enough to permit the steam to escape. Therefore, with the use of such a screening material, the foodstuff is properly fried rather than steamed.

The manufacture of such cooking utensils is an extremely competitive business. If one manufacturer can manufacture such a utensil at a lesser cost, a significantly competitive advantage is achieved. Such utensils of the prior art have been quite complex in construction and require a multitude of forming steps which significantly increases the manufacturing cost.

SUMMARY OF THE INVENTION

The primary feature of the apparatus and method of this invention is to provide a simple method of manufacturing a polygonal-shaped splatter screen. Prior to forming, the elements of the screen are assembled easily and quickly within a mold. By the application of a uniform force between the molding elements, the edging material of the polygonal-shaped screen is cold worked and is clamped upon the screening assembly thereby forming an integral unit. In order to insure that the screen does not buckle, the corners are cold worked to a greater degree than the other portions of the edging material. This additional cold working of the corners causes each corner to fold over to a greater degree upon itself which also pulls outwardly the screening assembly. This additional pulling force in each of the corners combines to form a quite taut screen assembly within the formed unit and therefore there is no buckling of the screen after the forming operation. Heretofore screen buckling has been one of the primary problems in the efficient manufacturing of such a screening utensil.

BRIEF DESCRIPTION OF THE DRAWING

FIG. 1 is a diagrammatic view of the means to form the corners within the edging material showing the means disassociated from the edging;

FIG. 2 is a view similar to FIG. 1 but showing the forming means in the position for forming a corner upon an edging strip;

FIG. 3 is an exploded isometric view of the mold and the screen elements which are employed within the method of this invention;

FIG. 4 is a cross-sectional view through a portion of the edging material located between the corners with the elements in the preformed state;

FIG. 5 is a view similar to FIG. 4 showing such in the formed state; and

FIG. 6 is a view similar to FIG. 5 but being taken through a corner of the screening utensil.

FIG. 7 shows the splatter screen in completed form.

DETAILED DESCRIPTION OF THE SHOWN EMBODIMENT

Referring particularly to the drawing, the fry pan utensil 10 which is to be formed by the method of this invention is composed basically of a screening assembly 12 which is secured within an edging 14. This screening assembly 12 is composed of a first layer 16 and a second layer 18. Each of the layers 16 and 18 is to be formed of the same material of construction and it is envisioned that the material of construction will be aluminum. Aluminum is particularly desirable because of its inherent resistance to rust.

The first layer 16 is formed in a corrugated manner having a series of closely spaced apart ridges. The second layer 18 is formed in substantially a single plane and includes a plurality of small elongated apertures. The apertures in the second layer are formed substantially similar to the apertures in the first layer, being somewhat elongated and approximately the same size. The first layer 16 and the second layer 18 are placed together so that an elongated dimension of the apertures between the layers are substantially transverse to one another. This particular arrangement is found to be desirable. As steam is readily passed therethrough, the droplets of grease are prevented from being passed therethrough.

The edging 14 is initially formed into a longitudinal strip which has an upper flange 20 and a lower flange 22. The length of the upper flange is approximately one half the length of the lower flange 22. The upper flange 20 and the lower flange 22 are connected together through an outside edge 24. The edging 14 is to be constructed of hard material with aluminum also being quite satisfactory.

The longitudinal edging 14 is first positioned within a corner forming mold assembly 26. This mold assembly 26 is depicted generally in FIGS. 1 and 2 of the drawing. The mold assembly 26 includes a male mold unit 28 and a female mold unit 30. The female mold unit 30 includes a mold cavity 32. The male mold unit 28 includes a protruding member 34. The exterior surface of the protruding member 34 is to be capable of matingly cooperating within the recess 32.

The edging 14 is to be located on top of the female unit 30 and across the recess 32. The male protruding member 34 is then forced into the cavity 32 resulting in a cold working of the material of the edging 14 which results in the edging 14 assuming a right angled corner configuration as shown in FIG. 2 of the drawing. This procedure is repeated along a given length of edging 14 until four such corners are formed.

It is normally desirable that the utensil 10 of this invention will assume a square shape. However, the utensil 10 may be readily formed within a rectangular shape or in any other polygonal configuration.

Once the corners of the edging are so formed, the edging 14 is then located within a first mold unit 36 having a cooperating mold cavity 38. The lower flange 22 is located directly in contact with the surface of the mold cavity 38 with the outside edge 24 in contact with the periphery of the cavity 38. The second layer 18 of the screening assembly 12 is then located within the mold cavity 38 so that the periphery of the second layer 18 comes into contact with the interior surface of the lower flange 22. The first layer 16 is then located on top of the second layer 18. The assembly is now ready to be formed into its final integral configuration.

A second mold unit 40 is to be employed which includes a mold cavity 42. The mold cavity 42 includes a central planar area 44 and a groove section 46 around the periphery thereof. It is to be noted that the groove section 46 is of a slightly less width in the area of each of the corners of the mold cavity 42. The reason for this width will become apparent further on in the specification.

Centrally located within the area 44 is a protuberance 48. The protuberance 48 is adapted to matingly cooperate within an aperture 50 which is formed within a block 52 which is fixed within the mold cavity 38. Upon the second mold unit 40 being caused to cooperate with the first mold unit 36, the protuberance 48 will pass through the screening assembly 12 and into the aperture 50. This results in the forming of a hole through the center portion of the screening assembly 12 so that a handle assembly 54 can be connected to the utensil 10. This handle assembly 54 includes a ring 56 so as to facilitate manual picking up and placing of the utensil 10 of this invention.

During the forming operation of the utensil 10 of this invention which is as the mold units 36 and 40 are brought together, the upper flange 20 cooperates within the groove section 46. The upper flange 20 is caused to deform into the shape of the groove section 46 and be forced down toward and into physical contact with the screening assembly 12. This forming operation is to continue until the edging 14 has taken the shape as shown in FIG. 5 of the drawing with the free edge of the upper flange 20 being located directly adjacent the lower flange 22 and frictionally binding together the first and second layers 18 and 20 of the screening assembly 12.

It has been found that if the groove section 46 is formed of uniform configuration, the screening assembly 12, after the forming operation, will tend to buckle. In order to avoid this buckling, the corners of the groove section 46 are formed slightly smaller in width. This slightly smaller width causes the upper flange 20 to not only be located adjacent the lower flange 22 but to move outwardly toward outside edge 24. As it moves outwardly toward the outside edge 24, the screening material 12 is moved with it and therefore a stretching operation occurs in each of the corners of the utensil 10. This stretching operation insures that after removal of the upper mold unit 40 after the forming operation, the screening assembly 12 will assume a smooth, taut configuration and there will be no buckling in any part thereof. This forming of the corners is clearly depicted within FIG. 6 of the drawing.

What is claimed as new in support of Letters Patent is:

1. A utensil to prevent splatter from a fry pan during cooking comprising:
   a screen assembly;
   an edging located about and secured to said screen assembly, said edging being polygonal-shaped resulting in the forming of a plurality of corners, the edging in each of said corners being of less thickness than said edging located between said corners.

2. The utensil as defined in claim 1 wherein:
   each of said corners being ninety degrees.

3. The utensil as defined in claim 2 wherein:
   said utensil being of a square configuration.

4. The utensil as defined in claim 3 wherein:
   said screen assembly comprises a first screening layer and a second screening layer, said first screening layer being substantially planar in configuration, said second screening layer being substantially corrugated in configuration.

5. The utensil as defined in claim 4 wherein:
   said first and second screening layers being formed of aluminum.

6. The method of making a utensil to prevent splatter from a fry pan during cooking comprising:
   preforming a plurality of corners into a longitudinal length of edging material;
   placing the edging material into a mold cavity;
   locating the peripheral edge of a screen assembly centrally of the edging and in contact therewith;
   applying a force to the upper surface of the edging sufficient to cause deforming of the upper surface toward the lower surface causing such to come into contact with the screening assembly and bind such securely to the edging; and
   causing the edging in the area of the corners to be deformed to a greater degree than the edging strip between each of the corners during the forming operation, thereby causing the screening material to be pulled taut.

7. The method of claim 6 wherein the step of applying includes the transmitting of a uniform force upon the edging.

8. The method of claim 7 wherein the corners are formed within the edging at a ninety degree angle.

9. The method of claim 8 wherein the edging is formed into a square configuration.

10. The method of claim 9 including:
    during the forming operation causing the formation of a hole through the screening assembly approximately centrally thereof to facilitate adaptation with a handle assembly.

* * * * *